United States Patent Office 3,436,514
Patented Apr. 1, 1969

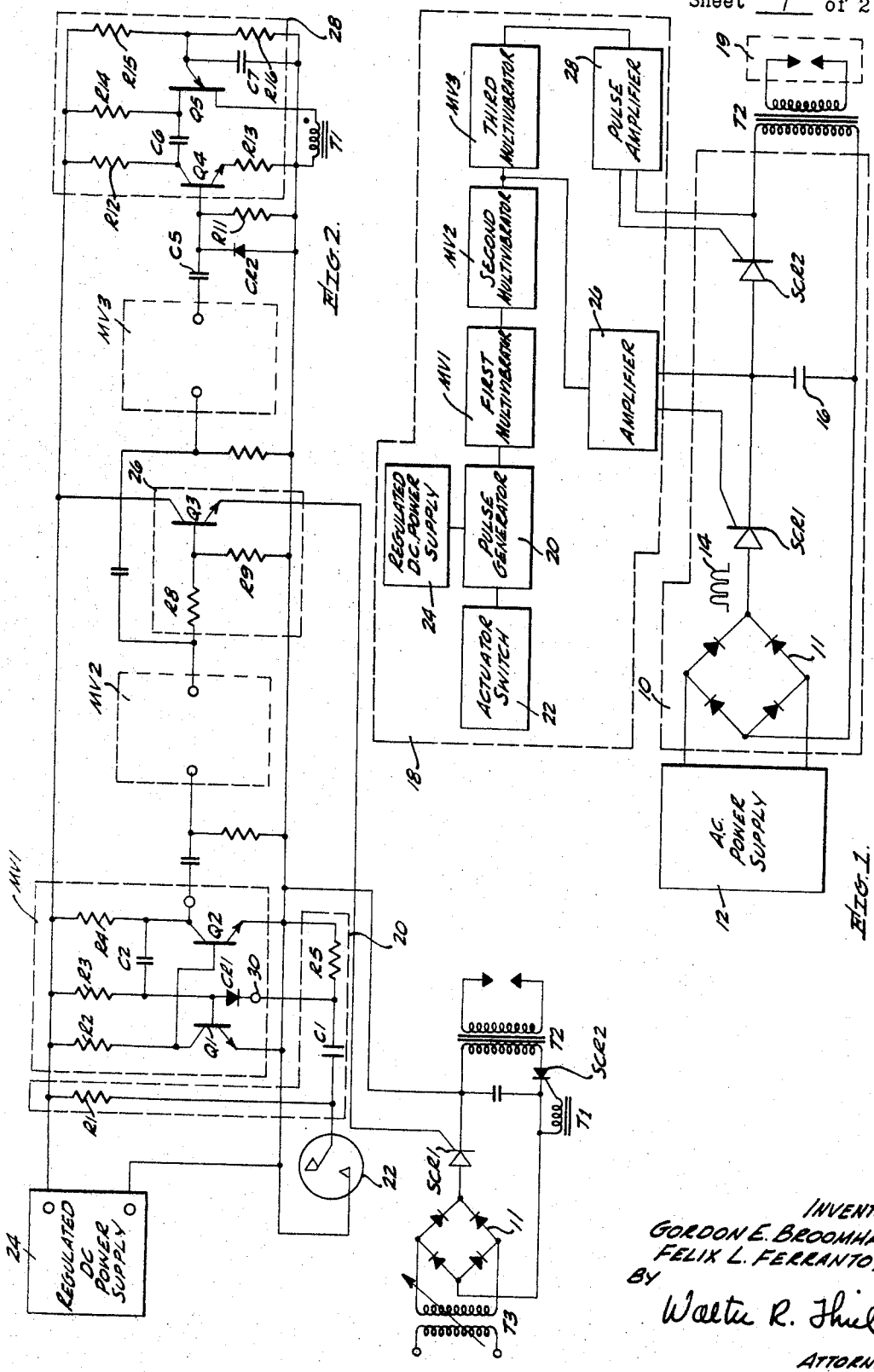

3,436,514
WELDER POWER SUPPLY
Gordon E. Broomhall, Escondido, and Felix L. Ferranto, Vista, Calif., assignors to Hughes Aircraft Company, Culver City, Calif., a corporation of Delaware
Filed Jan. 21, 1966, Ser. No. 522,109
Int. Cl. B23k 11/24
U.S. Cl. 219—113
12 Claims

ABSTRACT OF THE DISCLOSURE

A welder power supply including first and second silicon controlled rectifier switches respectively coupled in the charging and discharging circuit for a capacitor. The capacitor is charged by a full wave rectified voltage when the first switch is conductive and discharged into the primary winding of a welding transformer when the second switch is conductive. In operation an actuator switch is closed to initiate operation of a pulse generator. A first timing circuit coupled to the pulse generator effects a first timing pulse, and second and third timing circuits each coupled between the first timing circuit and the respective control electrodes of the respective first and second switches each effect respective second and third timing pulses. The timing pulses ensure proper charging and discharging of the capacitor by preventing simultaneous conduction of the first and second switches and by disabling the actuator switch for a predetermined time.

---

Figure 3:
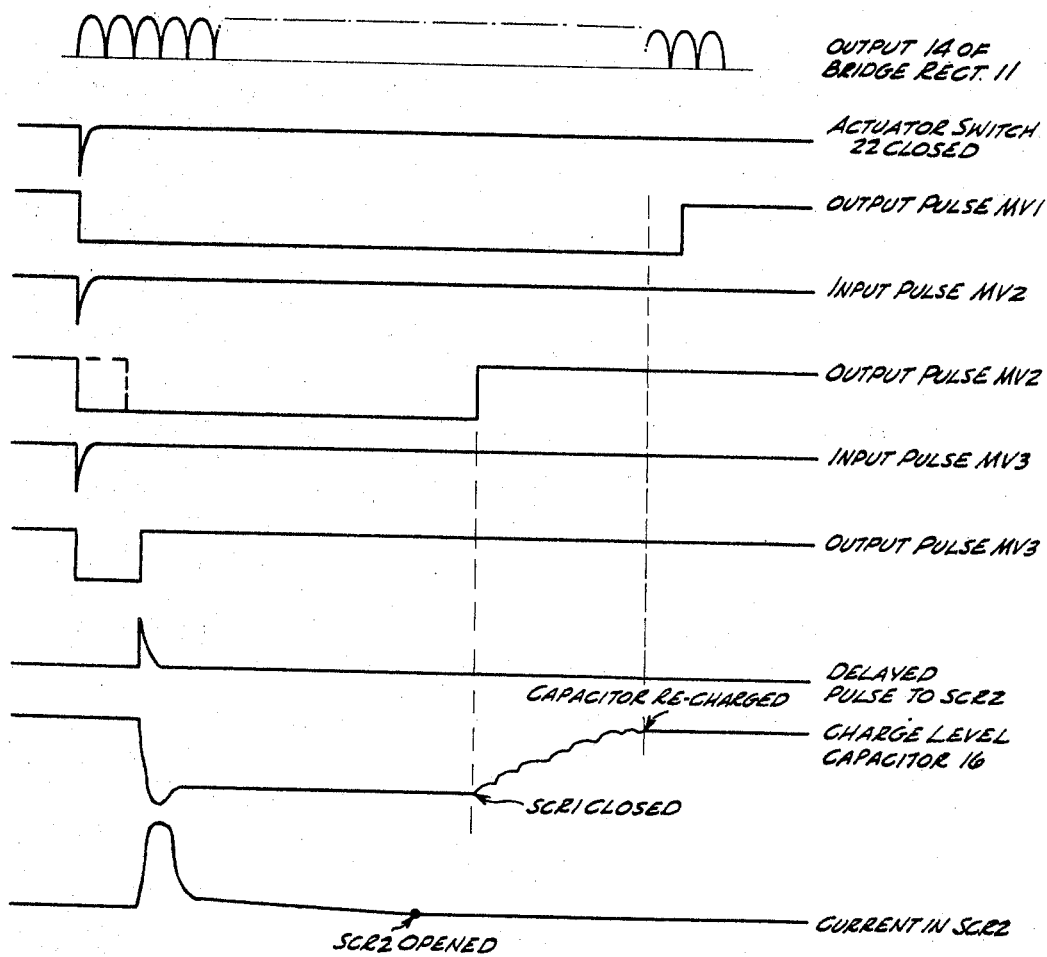

This invention relates to an improved welder power supply and more particularly to a lightweight, high current power supply of the stored energy type including in the charging and control circuits solid state components.

Heretofore, most welder power supplies of the stored energy type have utilized in their charging circuits vacuum tube components such as thyratron electron discharge devices. For more detail, such a circuit is described and depicted in United States Patent No. 2,483,691. The use of power supplies incorporating vacuum tube components has proven satisfactory for many years. However, with the increased use of stored energy welding systems in the manufacture and assembly of microcircuits and components, it has become desirable to have a power supply which is more efficient, smaller in size and has faster welding rates.

Therefore, a primary object of the improved welder power supply of the present invention is to provide a power supply having a high current output which is smaller in size, more reliable in operation and has improved charge and repetition rates.

A still further object of the present invention is to provide an improved welder power supply which incorporates solid state components not only for reduction in size, heat generated by the systems, and cost of the system, but to improve its overall operation and maintenance.

An additional object of the improved welder power supply of the present invention is to provide a high current power supply with improved safety features in which once actuated and the storage element discharged, the supply cannot be reactuated until the energy storage element has been recharged to a predetermined energy level.

The aforesaid and other objects and advantages are accomplished according to the present invention in a welder power supply having a charging circuit and a control circuit. The charging circuit includes a conventional bridge rectifier circuit coupled to a source of AC current such as line current, an energy storage element such as a capacitor coupled to the rectifier circuit and a welding transformer coupled to the energy storage element. Interposed between the output of the bridge rectifier and the capacitor, as well as between the capacitor and the primary of the welding transformer, are electronic switching devices which are operated in response to signals from the control circuit. The control circuit comprises a pulse generator circuit and a plurality of multivibrator circuits including timing circuits coupled to the electronic switching devices for disconnecting the capacitor from the bridge rectifier before it can be connected to the welding transformer and to ensure that once the capacitor is discharged it is recharged before it can again be coupled to the welding transformer.

Other objects and advantages will become apparent from a study of the following specification when considered in conjunction with the accompanying drawings in which:

FIGURE 1 is a block diagram of a preferred embodiment of the improved welder power supply of the present invention illustrating the relationship between the charging circuit and the control circuit;

FIG. 2 is a schematic drawing of the preferred embodiment shown in FIG. 1 illustrating in detail the electronic components comprising the charging and the control circuits of the present invention; and FIG. 3 is a plurality of timing diagrams illustrating on the basis of time the relationship of the voltage and current pulses developed by the primary electronic components and circuits shown in FIG. 2.

Referring first to FIG. 1 for a general discussion of the circuits comprising the improved high current power supply of the present invention, there is shown a charging circuit 10 which includes a conventional full wave bridge rectifier 11 coupled to a source of AC power 12 such as conventional AC line current. The voltage output of the bridge rectifier 11 typically consists of a waveform (FIG. 3) having a plurality of half sine waves of positive polarity which drop to a zero magnitude every one-half cycle of the AC power source. Coupled to the output of the bridge rectifier 11 is a charging rectifier SCR1 such as a conventional silicon controlled rectifier, which functions as a first electronic device switch to connect the rectified AC to an energy storage element 16 such as a capacitor or bank of capacitors which is coupled between the cathode electrode of the SCR1 and a reference voltage or ground. The charging rectifier SCR1 is normally maintained in the closed condition or conductive state by means of a DC current applied between its gate and cathode electrodes by a control circuit 18.

As shown in FIG. 2, if desired, the source of AC power 12 may include a variable transformer T3 the output power of which is variable to provide one method of preselecting the voltage of the energy storage capacitor.

A discharge rectifier SCR2 such as a conventional silicon controlled rectifier is coupled between one terminal of the primary of a welding transformer T2 and a first terminal of the capacitor 16 and functions as a second electronic switch device to connect the capacitor 16 to the primary of the weld transformer T2. The secondary of the welding transformer T2 is typically connected to the welding electrodes of a conventional weld head 19 such as described in U.S. Patent No. 3,191,000. Normally, the discharge rectifier SCR2 is in an open condition or nonconductive state and is fired or rendered conductive by its gate electrode receiving a pulse from the control circuit 18 at a time when the storage element 16 is charged and the charge rectifier SCR1 has been opened or is nonconducting.

It is the function of the control circuit 18 to ensure that the discharge rectifier SCR2 is open and remains in this condition when the charge rectifier SCR1 is in a closed condition and the capacitor 16 is being charged, and to ensure that the charge rectifier SCR1 is open when the discharge rectifier SCR2 is closed and the capacitor 16 is discharging and remains open until the capacitor 16 is fully discharged and the discharge rectifier SCR2 is again open.

The control circuit 18 comprises a pulse generator 20 to which is coupled an actuating switch 22 for actuating the operation of the welder power supply and a source of voltage 24 such as a conventional regulated 20 volt DC power supply. The pulse generator 20 is coupled to a first monostable multivibration circuit MV1 which in turn is coupled to a second monostable multivibrator circuit MV2 which is coupled to a third monostable multivibrator circuit MV3. Coupled between the output of the second monostable multivibrator MV2 and the gate electrode of the charge rectifier SCR1 is a pulse amplifier circuit 26 to amplify the pulse output of the second monostable multivibrator MV2 and to supply this pulse to the gate electrode of the charge rectifier SCR1. Similarly, coupled to the output of the third monostable multivibrator MV3 is a second pulse amplifier circuit 28 which is also coupled to the gate electrode of the discharge rectifier SCR2 for amplifying the pulse output of the third monostable multivibrator MV3 and coupling it to the gate electrode of the discharge rectifier SCR2.

The above has been a general discussion of the electronic circuits of the present invention and now by reference to FIGS. 2 and 3, a more detailed description of the circuits and the operation of each will be made. The waveforms illustrated in FIG. 3 are for the purpose of illustrating the time relationship of the output signals of certain of the electronic elements of the charging and control circuits and no effort has been made in FIG. 3 to illustrate relative magnitudes of the depicted waveforms.

For a clearer understanding of the electronic circuits of the present invention, the circuits thereof will first be described with the system in the quiescent state, followed by a description of the operation of these circuits when the actuating switch 22 is closed.

With the regulated power supply 24 on and the actuator switch 22 open a pulse capacitor C1 of the pulse generator 20 is charged through a pair of resistors R1 and R5 to approximately 20 volts or substantially the voltage output of the power supply 24. One terminal of the pulse capacitor C1 is coupled to the input terminal 30 of the first monostable multivibrator circuit MV1 and the other terminal is coupled through the actuator switch 22 to ground. The first multivibrator MV1 is conventional in design comprising a pair of semiconductor circuit devices such as conventional NPN transistors Q1 and Q2, a plurality of resistors R2, R3, R4, timing capacitor C2, and a diode CR1. In a like fashion the second multivibrator MV2 as well as the third multivibrator MV3 comprises a like circuit as that of the first multivibrator with the exception as will become more fully apparent of a variation in each of the capacitance of the timing capacitor C2 and resistor R3. This magnitude of the capacitance and resistance being dictated by the timing desired in the operation of the particular monostable multivibrator.

Prior to actuation of the switch 22, transistor Q1 is conducting in saturation because an excess of base current is provided to its base through resistor R3. At the same time the collector electrode of transistor Q1 and the base of transistor Q2 is nearly zero volts due to the voltage drop in the resistor R2. Further, the transistor Q2 is in its nonconductive state and its collector electrode voltage is substantially 20 volts since no current flows through resistor R4 resulting in timing capacitor C2 being charged to approximately 20 volts.

As mentioned above, the second and third monostable multivibrator circuits MV2 and MV3 are identical with the first monostable multivibrator MV1 and except for timing capacitor C2 and resistor R3 are not shown in FIG. 2 nor will the operation of their individual components be described. The input terminal of each multivibrator circuit is coupled to the output terminal of the succeeding multivibrator circuit through conventional R–C coupling circuits.

The first amplifier circuit 26 is connected to the output terminal of the second multivibrator MV2 and comprises a semiconductor device such as a conventional NPN transistor Q3 and a pair of voltage divider resistors R8 and R9. In the quiescent state approximately 3 volts appear at the base of transistor Q3 resulting in a current flowing through the transistor Q3 to the base cathode junction of the charge rectifier SCR1 rendering it conductive or in a closed condition.

Coupled to the output terminal of the third multivibrator circuit MV3 is a pulse amplifier circuit 28 comprising a delayed pulse circuit $C_5$, $R_{11}$ and $CR_2$, a pulse inverter transistor Q4 such as a conventional NPN transistor and a conventional unijunction transistor Q5 together with appropriate coupling capacitor C6, pulse capacitor C7, current limiting resistors R12, R13 and R14, and voltage divider resistors R15 and R16. The unijunction transistor Q5 has one base electrode coupled to the collector electrode of transistor Q4 through capacitor C6 and the other base electrode connected to the primary of a pulse transformer T1. The secondary of the pulse transformer T1 is coupled between the gate electrode of the discharge rectifier SCR2 and ground for coupling a switching pulse to the discharge rectifier SCR2.

In the preferred embodiment the unijunction transistor Q5 has approximately 19 volts between its bases and the voltage on its emitter is maintained below the trigger point for the transistor by the voltage divider resistors R15 and R16. This results in no current flowing in the emitter circuit of the transistor Q5 and permits the pulse capacitor C7 coupled to the emitter to be charged to approximately 10 volts.

When the actuator switch 22 is closed, the pulse capacitor C1 discharges through a path formed by the switch contacts and resistor R5. As this occurs, a pulse is provided at the junction of resistor R5 and capacitor C1 thereby removing the base drive current from transistor Q1 and rendering Q1 nonconductive. This results in the collector current of transistor Q1 diminishing to zero while the current through resistor R2 now flows to the base of transistor Q2 rendering it conductive and the collector current of transistor Q2 increases and the collector voltage decreases substantially to zero. This negative going voltage is coupled through capacitor C2 to the base of transistor Q1 to drive it more negative and maintain it nonconductive. As this results capacitor C2 commences to discharge through the resistors R3 and R4 until a point is reached when current flow in resistor R3 is diverted to the base of transistor Q1. This base current of transistor Q1 renders it conductive at the same time transistor Q2 is rendered nonconductive returning the first multivibrator MV1 to its quiescent state. The value of capacitor C2 and resistor R3 is selected to effectively disable the actuator switch 22 until the entire welding cycle has been completed. As previously discussed, when the actuator switch is closed the collector voltage of transistor Q2 goes in a negative direction and this negative going voltage is coupled to the second multivibrator MV2 causing its timing cycle to commence and the output voltage of the second multivibrator MV2 drops nearly to zero. As a result of this, the base drive of transistor Q3 drops to zero and the gate cathode drive of the charge rectifier SCR1 also drops to zero. Since the anode voltage of the charge rectifier SCR1 is a series of half cycle AC sine waves, once every half cycle the anode voltage of the charge rectifier becomes zero and since capacitor 16 is fully charged the anode cathode voltage of the charge rectifier SCR1 becomes reversed. Therefore, in the absence of a gate signal, charge rectifier SCR1 opens and remains open for the duration of the timing period of the second multivibrator MV2. This timing period is selected through the choice of the timing capacitor and resistor of the second multivibrator MV2 so as to maintain the charge rectifier SCR1 open until the discharge rectifier SCR2 has been also opened.

The operation of the third multivibrator MV3 is triggered by the negative polarity output signal from the second multivibrator MV2. Thus, the starting of its timing cycle is substantially coincident with the closing of the actuator switch 22. At the starting of its timing cycle the output signal of the third multivibrator MV3 goes in a negative polarity causing pulse capacitor C5 to discharge through diode CR2 and effectively grounding the output signal of the third multivibrator until this signal goes in a positive direction at the end of the timing cycle. As clearly seen in FIG. 3, the pulse to switch the discharge rectifier SCR2 on or closed is delayed until the charge rectifier SCR1 is opened, which could be a time interval as long as a half cycle of the AC power supply output signal; therefore, the period or time interval of the third multivibrator MV3 must be greater than a half cycle. This diode CR2 functions to ensure that the positive going signal at the end of the period of the third multivibrator MV3 causes the transistor Q4 to conduct, rather than some other signal. At the end of the timing period of the third multivibrator MV3 its output voltage goes in a positive direction causing the transistor Q4 to be more conductive wherein the collector voltage of transistor Q4 becomes less positive and the base of the unijunction transistor Q5 also becomes less positive, lowering its firing point until its emitter triggers discharging the pulse capacitor C7 rapidly through the primary of transformer T1. The pulse of current thus generated serves to fire or close the discharge rectifier SCR2 which in turn discharges the capacitor 16 through the primary of the weld transformer T2. The time delay of the third multivibrator MV3 is adjusted so that SCR1 will not fire or close until SCR2 is opened. This is clearly seen in the last two waveforms of FIG. 3.

Although the bulk of the charge on storage capacitor 16 is transferred rapidly through the primary windings of transformer T2 when the discharge rectifier SCR2 closes the internal impedance of the capacitor 16 causes a small current to flow in the discharge rectifier SCR2 for a relatively long time after the main discharge. As a result it is necessary to wait until the discharge rectifier SCR2 is opened before the charge rectifier SCR1 is again closed. The time constant of the second multivibrator MV2 performs this delay function as previously discussed.

When the charge rectifier SCR1 closes again, that is, at the end of the period of the second multivibrator MV2, the storage capacitor 16 is again recharged; however, the timing period of the first multivibrator MV1 is adjusted so that the actuator switch 22 will not initiate a weld cycle until the energy capacitor 16 has been recharged to a preselected level. Thus, without the first multivibrator MV1 the discharge rectifier SCR2 could be closed before the storage capacitor 16 has been completely recharged. To prevent both the charge rectifier SCR1 and the discharge rectifier SCR2 from being conductive in the closed condition at the same time, the timing period of MV2 ensures that the charge rectifier SCR1 remains open until the discharge rectifier SCR2 is also opened. This prevents a continuous current from flowing through the transformer T3 and the bridge rectifier 11 which could damage the AC power supply and associated components.

While the basic principle of this invention has been herein illustrated along with one embodiment it will be appreciated by those skilled in the art that variations in the disclosed arrangement both as to its details and as to the organization of such details may be made without departing from the spirit and scope thereof. Accordingly, it is intended that the foregoing disclosure and the showings made in the drawings will be considered only as illustrative of the principles of the invention and not construed in a limiting sense.

What is claimed is:

1. In combination with a weld head having first and second welding electrodes, a welder power supply comprising:
    a transformer having a primary winding and a secondary winding, said secondary winding being coupled between said first and second electrodes;
    a capacitor having first and second terminals;
    power supply means coupled between said first and second terminals for charging said capacitor to a preselected voltage;
    a first electronic switch device having a current path and a control electrode for controlling the charging of said capacitor, said current path and said capacitor being coupled in series;
    a second electronic switch device having a current path and a control electrode for controlling the discharging of said capacitor, said current path and said transformer primary winding being connected in series between the first and second terminals of said capacitor;
    control circuit means coupled to the control electrodes of said first electronic switch device and said second electronic switch device for controlling the opening and closing thereof at preselected times during one cycle of operation of said welder power supply; and
    said control circuit means including at least two monostable multivibrator circuit means each coupled to the control electrode of a different one of said first electronic switch device and said second electronic switch device and each monostable multivibrator circuit means providing a pulse of different duration.

2. The welder power supply of claim 1 wherein one of said monostable multivibrator circuit means includes a pulse delay circuit for delaying the closing of one of the electronic switches until the end of the period of said one monostable multivibrator circuit.

3. In combination with a weld head having first and second welding electrodes, a welder power supply comprising:
    a transformer having a primary winding and a secondary winding, said secondary winding being coupled between said first and second electrodes;
    a capacitor having first and second terminals;
    power supply means coupled between said first and second terminals for charging said capacitor to a preselected voltage;
    a first electronic switch device having a current path and a control electrode for controlling the charging of said capacitor, said current path and said capacitor being coupled in series;
    a second electronic switch device having a current path and a control electrode for controlling the discharging of said capacitor, said current path and said transformer primary winding being connected in series between the first and second terminals of said capacitor;
    control circuit means coupled to the control electrodes of said first electronic switch device and said second electronic switch device for controlling the opening and closing thereof at preselected times during one cycle of operation of said welder power supply; and
    said control circuit means including a plurality of timing circuit means providing respective timing signals of different durations for maintaining said first electronic switch device in an open condition at the same time as maintaining said second electronic switch device in a closed condition.

4. In combination with a weld head having first and second welding electrodes, a welder power supply comprising:
    a transformer having a primary winding and a secondary winding, said secondary winding being coupled between said first and second electrodes;
    a capacitor having first and second terminals;

power supply means coupled between said first and second terminals for charging said capacitor to a preselected voltage;

a first electronic switch device having a current path and a control electrode for controlling the charging of said capacitor, said current path and said capacitor being coupled in series;

a second electronic switch device having a current path and a control electrode for controlling the discharging of said capacitor, said current path and said transformer primary winding being connected in series between the first and second terminals of said capacitor;

control circuit means coupled to the control electrodes of said first electronic switch device and said second electronic switch device for controlling the opening and closing thereof at preselected times during one cycle of operation of said welder power supply;

an actuator switch for operating said welder power supply;

said control circuit means including pulse generator means adapted to generate a pulse of a preselected magnitude when said actuator switch is closed;

said control circuit means further including first, second, and third timing circuit means;

said first timing circuit means being coupled to said pulse generator means for generating a timing pulse of a first preselected duration simultaneously with the closing of said actuator switch;

said second timing circuit means being coupled to the first timing means and to the control electrode of said first electronic switch for generating a second timing pulse of a preselected duration simultaneously with the closing of said actuator switch for placing said first electronic switch in an open condition for the duration of said second pulse; and said third timing circuit means being coupled to the control electrode of the second electronic switch and to the second timing means and adapted to generate a third timing pulse of a preselected duration simultaneously with the closing of said actuator switch and adapted to place said second electronic switch device in a closed condition for discharging said capacitor through the primary winding of said transformer.

5. The welding power supply of claim 4 wherein the timing pulse of said third timing means is of a shorter duration than the timing pulses of said first and second timing means, but of duration longer than the time necessary to open said first electronic switch device, and said third timing means includes a pulse amplifier circuit means adapted to delay the pulse to the control electrode of the second electronic switch until the end of the timing pulse generated by said third timing means whereby said capacitor cannot be discharged by the closing of said second electronic switch device while said first electronic switch device is in a closed condition.

6. The welding power supply of claim 5 wherein the timing pulse of said second timing circuit means is of a shorter duration than the timing pulse of said first timing circuit means whereby said capacitor cannot be discharged until it has been charged to a preselected voltage.

7. In a power circuit for a welder the combination comprising:

a welding transformer having a primary winding and a secondary winding, said secondary winding being coupled to a pair of welding electrodes;

capacitor means;

a first electronic switch having a first control electrode, said first electronic switch being biased so as to be normally conductive;

power supply means;

said first electronic switch being connected between said capacitor means and said power supply means so that said capacitor means may be charged to a preselected voltage by said power supply means when said first electronic switch is conductive and so that said capacitor means is operably disconnected from said power supply means when said first electronic switch is rendered nonconductive;

a second electronic switch having a second control electrode, said second electronic switch being biased so as to be normally nonconductive;

said second electronic switch being connected between said capacitor means and said primary winding so that discharge of said capacitor means into said primary winding is prevented when said second electronic switch is nonconductive and so that said capacitor means may discharge into said primary winding when said second electronic switch is rendered conductive;

control circuit means for controlling the charging and discharging of said capacitor means;

means to initiate operation of said control circuit means;

said control circuit means including a plurality of timing means, said plurality of timing means including first, second and third timing circuits for respectively generating first, second and third timing pulses wherein the duration of the first timing pulse is greater than the duration of the second timing pulse and the duration of the third timing pulse is greater than the duration of the first timing pulse;

said first timing circuit being operably coupled to said first control electrode, said second timing circuit being operably coupled to said second control electrode, and said third timing circuit being operably coupled to said first and second timing circuits whereby initiation of the third timing pulse in response to initiation of operation of said control circuit means causes initiation of the first and second timing pulses whereby the third timing circuit is operative to synchronize the operation of said first and second timing circuits;

said first timing circuit being operative to maintain the first electronic switch nonconductive for substantially the duration of the first timing pulse;

said second timing circuit being operative to render the second electronic switch conductive after the termination of the second timing pulse for a period less than the duration of the third timing pulse, the duration of the second timing pulse being greater than the time required for the first timing pulse to render said first electronic switch nonconductive whereby simultaneous conduction of said first and second electronic switches is prevented; and said third timing circuit being operative to prevent re-initiation of operation of the control circuit prior to the recharging of said capacitor means to the preselected voltage.

8. The power circuit of claim 7 wherein said first, second, and third timing circuits include respective first, second, and third monostable multivibrators.

9. The power circuit of claim 7 wherein said means for initiating operation of said control circuit includes an actuator switch, said control circuit being operable in response to actuation of said actuator switch.

10. The power circuit of claim 7 wherein the first timing circuit includes a pulse amplifier for amplifying the first timing pulse.

11. The power circuit of claim 7 wherein said first and second electronic switches are controlled rectifiers.

12. The power circuit of claim 7 wherein the power supply means is a source of pulsating D.C. having a voltage peak corresponding to the preselected voltage and wherein the duration of a half cycle of the pulsating D.C. is less than the time duration of the second pulse.

References Cited

UNITED STATES PATENTS

| | | | |
|---|---|---|---|
| 3,205,378 | 9/1965 | Kline | 219—113 X |
| 3,246,113 | 4/1966 | Scarpelli | 219—111 X |
| 3,274,475 | 9/1966 | Poss | 320—1 |
| 3,290,581 | 12/1966 | Hooper | 321—45 |
| 3,316,476 | 4/1967 | Olson et al. | 321—45 |
| 3,331,014 | 7/1967 | Greenberg et al. | 321—18 X |
| 3,355,569 | 11/1967 | Muccino | 219—113 X |
| 3,360,632 | 12/1967 | Huffman | 219—113 |

RICHARD M. WOOD, *Primary Examiner.*

C. L. ALBRITTON, *Assistant Examiner.*

U.S. Cl. X.R.

219—131; 320—1; 307—252, 305; 315—238, 241